US010285200B2

United States Patent
Li et al.

(10) Patent No.: US 10,285,200 B2
(45) Date of Patent: May 7, 2019

(54) CHANNEL ACCESS POLICY CONTROL DURING WIRELESS COMMUNICATION

(71) Applicant: Apple Inc., Cupertino, CA (US)

(72) Inventors: Guoqing Li, Campbell, CA (US); Christiaan A. Hartman, San Jose, CA (US); Ashok Ranganath, Cupertino, CA (US); Joonsuk Kim, Saratoga, CA (US); Matthew L. Semersky, San Jose, CA (US); Oren Shani, Saratoga, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/403,092

(22) Filed: Jan. 10, 2017

(65) Prior Publication Data

US 2017/0202015 A1 Jul. 13, 2017

Related U.S. Application Data

(60) Provisional application No. 62/277,185, filed on Jan. 11, 2016.

(51) Int. Cl.
*H04W 74/02* (2009.01)
*H04W 84/12* (2009.01)
*H04W 74/00* (2009.01)

(52) U.S. Cl.
CPC .......... *H04W 74/02* (2013.01); *H04W 74/006* (2013.01); *H04W 84/12* (2013.01)

(58) Field of Classification Search
None
See application file for complete search history.

(56) References Cited

U.S. PATENT DOCUMENTS

| 2010/0332822 | A1* | 12/2010 | Liu | H04W 12/04 |
| | | | | 713/151 |
| 2012/0008605 | A2* | 1/2012 | Montemurro | H04W 74/006 |
| | | | | 370/338 |
| 2016/0198500 | A1* | 7/2016 | Merlin | H04W 74/08 |
| | | | | 370/329 |
| 2018/0227891 | A1* | 8/2018 | Yang | H04W 74/00 |

\* cited by examiner

*Primary Examiner* — Alex Skripnikov
(74) *Attorney, Agent, or Firm* — Dickinson Wright RLLP (57) ABSTRACT

An access point selects a channel access policy for an electronic device in a wireless local area network (WLAN). During operation, an interface circuit of the access point receives a channel access preference from the electronic device. The channel access preference includes: a multi-user trigger-based channel access technique, a single-user contention-based channel access technique, or both. The interface circuit selects the channel access policy for the electronic device based, at least in part, on the received channel access preference. The channel access policy can also be selected based at least in part on a communication performance metric associated with communication in the WLAN. The interface circuit communicates the selected channel access policy to the electronic device, which subsequently accesses a communication channel and communicates packets with the access point in accordance with the channel access policy.

20 Claims, 4 Drawing Sheets

CHANNEL ACCESS POLICY CONTROL DURING WIRELESS COMMUNICATION

CROSS-REFERENCE TO RELATED APPLICATIONS

The present application claims the benefit of U.S. Provisional Application No. 62/277,185, entitled "CHANNEL-ACCESS-POLICY CONTROL DURING WIRELESS COMMUNICATION" filed Jan. 11, 2016, the content of which is incorporated by reference herein in its entirety for all purposes.

FIELD

The described embodiments relate, generally, to wireless communications among electronic devices in a wireless local area network (WLAN), including systems and techniques for receiving a channel access policy preference from another electronic device and selecting a channel access policy for the other electronic device based, at least in part, on the received channel access policy preference.

BACKGROUND

Many wireless local area networks (WLANs), such as those based on a communication protocol that is compatible with an IEEE 802.11 standard (which is sometimes referred to as 'Wi-Fi'), involve contention-based distributed access systems. For example, Wi-Fi often uses single-user transmission via enhanced distributed channel access or EDCA. In particular, the WLANs are usually contention based because they typically utilize unlicensed frequency bands or spectra, which are unpredictable and are often subject to interference. The unpredictability of the interference can make coordination across multiple electronic devices (which are sometimes referred to as 'stations' or STAs) challenging (especially for an unmanaged WLAN), and can result in the failure of a collision free period (CFP). However, the use of fully distributed channel access can allow a simpler access point (AP) and a simpler network deployment (relative to a cellular network), which can make it easier and cheaper to deploy a WLAN.

Recently, contention-free multi-user transmission for uplink communication from STAs to an AP has been proposed in the IEEE 802.11ax standard. This approach can dramatically change how an electronic device accesses the communication medium. In particular, an electronic device can transmit without contending for the communication medium. Instead, an access point may manage access to the communication medium for the electronic device, and may grant transmission opportunities to the electronic device using a trigger frame (which is sometimes referred to as 'trigger-based access' or 'trigger-based channel access,' e.g., uplink multi-user transmission). During trigger-based uplink channel access, an access point may: sense the communication medium and, as needed, perform a back-off operation on behalf of potential uplink trigger-access-enabled electronic devices; define the uplink physical layer convergence protocol (PLPC) protocol data unit (PDU) or PPDU duration for the electronic device; and decide the modulation and coding scheme (MCS) for the electronic device.

In principle, if more electronic devices rely on trigger-based access, then the overall contention in the WLAN can be reduced. Consequently, trigger-based access is often expected to result in improved communication performance. However, in practice, this is not always the case. In particular, depending on overhead required for the trigger-based access and on a distance between the electronic device and the access point, single-user EDCA may be preferred to multi-user uplink trigger-based access.

For example, for the same transmission opportunity (TXOP) in a low contention environment, trigger-based access typically results in poorer communication performance. This is because, in contrast with EDCA, the overhead from the multi-STA block acknowledgement (M-BA) frame in each TXOP can grow linearly with the number of electronic devices in trigger-based access (i.e., each electronic device may be acknowledged more frequently). Moreover, Orthogonal Frequency-Division Multiple Access (OFDMA) in multi-user uplink trigger-based access can outperform single-user EDCA as the distance between electronic devices and the access point increases (i.e., the far-distance case) because multi-user uplink trigger-based access typically uses a higher MCS, which can increase the overall throughput. Therefore, it can be difficult to select a channel access policy for an electronic device in a WLAN.

SUMMARY

Embodiments that relate to an access point that selects a channel access policy for an electronic device in a WLAN (such as a WLAN that uses IEEE 802.11ax) are disclosed herein. In particular, during operation an interface circuit of the access point receives a channel access preference from the electronic device. For example, the channel access preference may be for: a multi-user trigger-based channel access technique, a single-user contention-based channel access technique (such as EDCA), or both. The interface circuit of the access point selects the channel access policy for the electronic device based, at least in part, on the received channel access preference (more generally, the channel access policy may be selected based at least in part on a communication performance metric associated with communication in the WLAN). The interface circuit of the access point communicates the selected channel access policy to the electronic device.

In some embodiments the selected channel access policy for the electronic device is used at all times. Alternatively, the selected channel access policy for the electronic device may be used during particular times or service periods. For example, the selected channel access policy may be used in conjunction with a target wakeup time (TWT) schedule or a power saving multi-poll (PSMP) schedule.

Furthermore, in some embodiments, the access point receives channel access preferences from multiple electronic devices. The access point can aggregate the electronic devices into groups of electronic devices based on their respective indicated channel access preferences. These groups of electronic devices can each have different channel access policies. Alternatively, the same channel access policy may be used for all of the multiple electronic devices.

The channel access information (such as the channel access preference and/or the selected channel access policy) may be communicated during an association procedure (such as in an association request) and/or by exchanging a management frame between the electronic device and the access point. Moreover, the channel access information may be communicated using unicast messages and/or broadcast messages.

Other embodiments, which implement operations, methods, and/or processes described herein, provide an interface circuit for an access point and/or an interface circuit for an electronic device configurable for communication with an access point. The electronic device can communicate a channel access preference to the access point using the interface circuit, and the access point can provide to the electronic device a channel access policy using the interface circuit. The access point can select the channel access policy for the electronic device based at least in part the channel access preference communicated by the electronic device.

Other embodiments provide a computer-program product storing computer executable instructions for use with an interface circuit of an access point. The computer-program product stores instructions for at least some of the aforementioned operations performed by the interface circuit of the access point. Execution of the instructions by the interface circuit of the access point causes the access point to perform operations including receiving a channel access preference from an electronic device, selecting a channel access policy for the electronic device based at least in part on the received channel access preference, and providing the selected channel access policy to the electronic device. In some embodiments, execution of the instructions causes the access point to aggregate channel access preferences from multiple electronic devices to form groups of electronic devices, where for each group of electronic devices a channel access policy is selected and communicated thereto.

Other embodiments provide a method for selecting a channel access policy. This method includes at least some of the aforementioned operations performed by the interface circuit of the access point. The access point selects a channel access policy for an electronic device (or for a group of electronic devices) based on channel access preferences provided by the electronic device (or by multiple electronic devices). The selected channel access policy is selected based at least in part on the provided channel access preferences and communicated to the electronic device(s).

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

An access point that selects a channel access policy for an electronic device in a wireless local area network or WLAN is described. During operation an interface circuit in the access point receives a channel access preference from the electronic device. For example, the channel access preference may be: a multi-user trigger-based channel access technique, a single-user contention-based channel access technique (such as enhanced distributed channel access or EDCA), or both. The interface circuit of the access point selects the channel access policy for the electronic device based, at least in part, on the received channel access preference (and, more generally, based at least in part on a communication-performance metric associated with the communication in the WLAN). The interface circuit of the access point communicates the selected channel access policy to the electronic device. The electronic device may access a communication channel based at least in part on the channel access policy, e.g., by using information in the channel access policy, and may transmit a packet to the access point in accordance with the channel access policy.

By selecting the channel access policy for the electronic device, the access point may improve the communication performance in the WLAN. In particular, by facilitating communication of channel access information (such as the channel access preference and/or the selected channel access policy), this communication technique may allow more informed decisions about the channel access policy, including information that is available to the transmitter (i.e., the electronic device) and the receiver (the access point). Consequently, the exchange of channel access information may result in improved decisions about the channel access policy, which may improve the communication performance (such as the throughput). In deed, through increasing the communication performance for communication between the electronic device (or for a group of electronic devices) and the access point, communication performance for other electronic devices that share the same communication medium may also improve. Furthermore, the improved communication performance may improve the user experience when using the electronic device and the access point, which may increase customer satisfaction and retention.

Note that the communication technique may be used during wireless communication between electronic devices in accordance with a communication protocol, such as: an Institute of Electrical and Electronics Engineers (IEEE) 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The electronic device, in some embodiments, can also operate as part of a wireless communication system, which can include a set of client devices, which can also be referred to as stations, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

Thus, in some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different legacy RATs, such as third generation (3G) and/or second generation (2G) RATs. In these scenarios, a multi-mode electronic device or UE can be configured to prefer attachment to LTE networks offering faster data rate throughput, as compared to 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when later generation, such as LTE, LTE-A, and 5G, networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. Trigger-based access can allow an electronic device, e.g., a station (STA), to access a communication medium without contending for the communication medium. The STA can transmit without contention because an associated AP contends the communication medium on behalf of the STA and grants transmission opportunities to the STA using trigger frames. The communication medium can be shared by multiple STAs to transmit in the uplink to the AP, and thus this type of access can also be referred to as trigger-based, multi-user (MU) uplink (UL) access transmission. The AP can perform a back-off operation, after sensing the communication medium, on behalf of all potential UL trigger-access enabled STAs. The AP can determine a UL PPDU time duration for one of more of the STAs and also determine MCS values for the one or more of the STAs. In a low contention communication environment, for the same TXOP duration, a trigger-based access scheme may perform more poorly than an EDCA scheme, as the overhead for multi-STA block acknowledgement (M-BA) in a TXOP increases linearly with the number of STAs, while overhead for EDCA does not grow similarly.

Communication performance in a WLAN (such as the throughput) that uses trigger-based access can depend on many factors, such as: the TXOP duration, the overhead for M-BA, the distance between an electronic device and an access point, the trigger interval, etc. Moreover, the throughput can depend on additional factors, such as: the traffic load, the number of neighboring basic service sets (BSSs) and a density of electronic devices, the use of multi-user request to send (RTS) and clear to send (CTS), etc. Consequently, trigger-based access may not always outperform EDCA even for the case of a single BSS. Stated differently, an electronic device that only is allowed to use trigger-based access may be put at a disadvantage for channel access and communication performance. These challenges may increase when additional communication performance criteria (such as latency) are considered.

In general, in extreme cases, EDCA may work better for a lightly loaded and sparse (non-dense) WLAN because it is typically free of scheduling overhead. Alternatively, trigger-based access may, in general, work better for a heavily loaded and dense WLAN because of a reduction in collisions. When accounting for distance between an AP and multiple STAs, trigger-based access may perform better at longer distances than EDCA as the trigger-based access can use higher values of MCS, which can increase throughput performance. In addition, the use of a trigger frame interval for trigger-based access can impact both downlink (DL) and uplink (UL) performance, such as throughput and/or packet error rate (PER).

Moreover, in the communication technique described herein, an electronic device may use: EDCA access, trigger-based access, or both EDCA and trigger-based access. However, if an electronic device does not select the correct channel access policy, its communication performance may be significantly degraded. The challenge is how to choose or select a channel access policy for an electronic device in a WLAN.

Furthermore, in the communication technique described herein, because an access point knows (or has access to information specifying) the number of electronic devices or STAs in a BSS and the traffic load of a given electronic device, the access point may be able to help the electronic devices make improved decisions regarding their channel access policies. For example, by specifying that a large number of electronic devices only use trigger-based access, an access point may set up a target wakeup time (TWT) schedule having a longer service-period duration (i.e., a wake-up schedule) for these electronic devices. Moreover, these electronic devices may achieve a higher throughput by using trigger-based access than if they were to freely contend for the communication medium.

However, some electronic devices may have fixed requirements on particular packet(s) that may need to be delivered immediately and, therefore, the electronic devices cannot wait for the arrival of a trigger frame in order to send their data. For example, if an electronic device is running a peer-to-peer protocol (e.g., Wi-Fi direct, neighborhood awareness networking or NAN, etc.), the electronic device may have to switch to a peer-to-peer network and may need to notify the access point that it is unavailable (e.g., through a power-save or PS bit) with very short latency. More generally, if an electronic device is using a common antenna to communicate using different communication protocols, when the electronic device switches from one communication protocol to another, it may need to alert or notify the access point of the change with very short latency. In such cases, the electronic device may not want to only use a trigger-based channel access policy.

In order to address these challenges, in the communication technique, the channel access policy used by an electronic device may be negotiated between the electronic device and the access point. During the channel access policy negotiation, the electronic device may provide its channel access preference to the access point. For example, the electronic device may provide information that indicates: it is ok to only use a trigger-based access schedule; or that it is not ok to only use a trigger-based access schedule, i.e., that the electronic device wants to use both trigger-based access and EDCA even if the resulting throughput may be reduced and which of the access mechanisms is preferred over the other. Note that the negotiation can be applied to a particular scheduled time period, such as for a target wakeup time (TWT) schedule or a power saving multi-poll (PSMP) schedule.

Based on the received channel access preference of the electronic device, an access point may establish different schedules for different groups of electronic devices. The access point may aggregate the electronic device into a group of one or more electronic devices that may share schedules based on channel access preferences. Moreover, there may be different groups of electronic devices with each group having different channel access types or combinations thereof. For example, using a TWT schedule as an illustrative example, the groups of electronic devices may have different TWT schedules with different channel access types. In some TWT schedules, the electronic devices in a group may only use trigger-based access. Furthermore, in other TWT schedules, the electronic devices in a group use a combination of both trigger-based access and EDCA. Note that, based on the implementation, an access point may set up a longer TWT service-period duration and a large number of electronic devices to only use a trigger-based-access TWT schedule because, in this case, there is no contention.

In general, the communication technique may be used to improve a communication performance metric in the WLAN. For example, the communication performance metric may include: a received signal strength (RSS), a data rate, a data rate for successful communication (which is sometimes referred to as a 'throughput'), an error rate (such as a retry or resend rate), a mean-squared error of equalized signals relative to an equalization target, inter-symbol interference, multi-path interference, a signal-to-noise ratio (SNR), a width of an eye pattern, a ratio of a number of bytes successfully communicated during a time interval (such as during a time period of one to ten seconds) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

The channel access information may be communicated between electronic devices and an access point in a variety of ways. In particular, an electronic device may report its channel access preference for its channel access policy (such as whether it is ok to only use trigger-based access or not) to an access point during association or during a separate management frame exchange. Moreover, if an access point wants to apply the channel access policy only to a particular time interval or period (such as for a TWT schedule), then channel access information communicated by the access point to the electronic device(s) may need to define or specify whether trigger-based access is (or is not) only used for the TWT schedule. Alternatively, if the access point wants to apply the channel access policy to all electronic devices in the entire BSS, then the channel access information may need to be defined or specified in a high efficiency (HE) operation element of a field, which may be communicated in a beacon.

In some embodiments, an electronic device reports its channel access preference via an 'access policy element' that is communicated in an association request. The access policy element may include an indication as to whether (or not) it is permissible for the electronic device to only use trigger-based access, to only use EDCA, or to use trigger-based access and EDCA.

Alternatively or additionally, in some embodiments a new management frame can be defined, such as an action frame that can be referred to as an 'access policy change action frame.' This access policy change action frame may include the indication whether (or not) it is permissible for the electronic device to only use trigger-based access, to only use EDCA, or to use trigger-based access and EDCA.

Figure 1A:
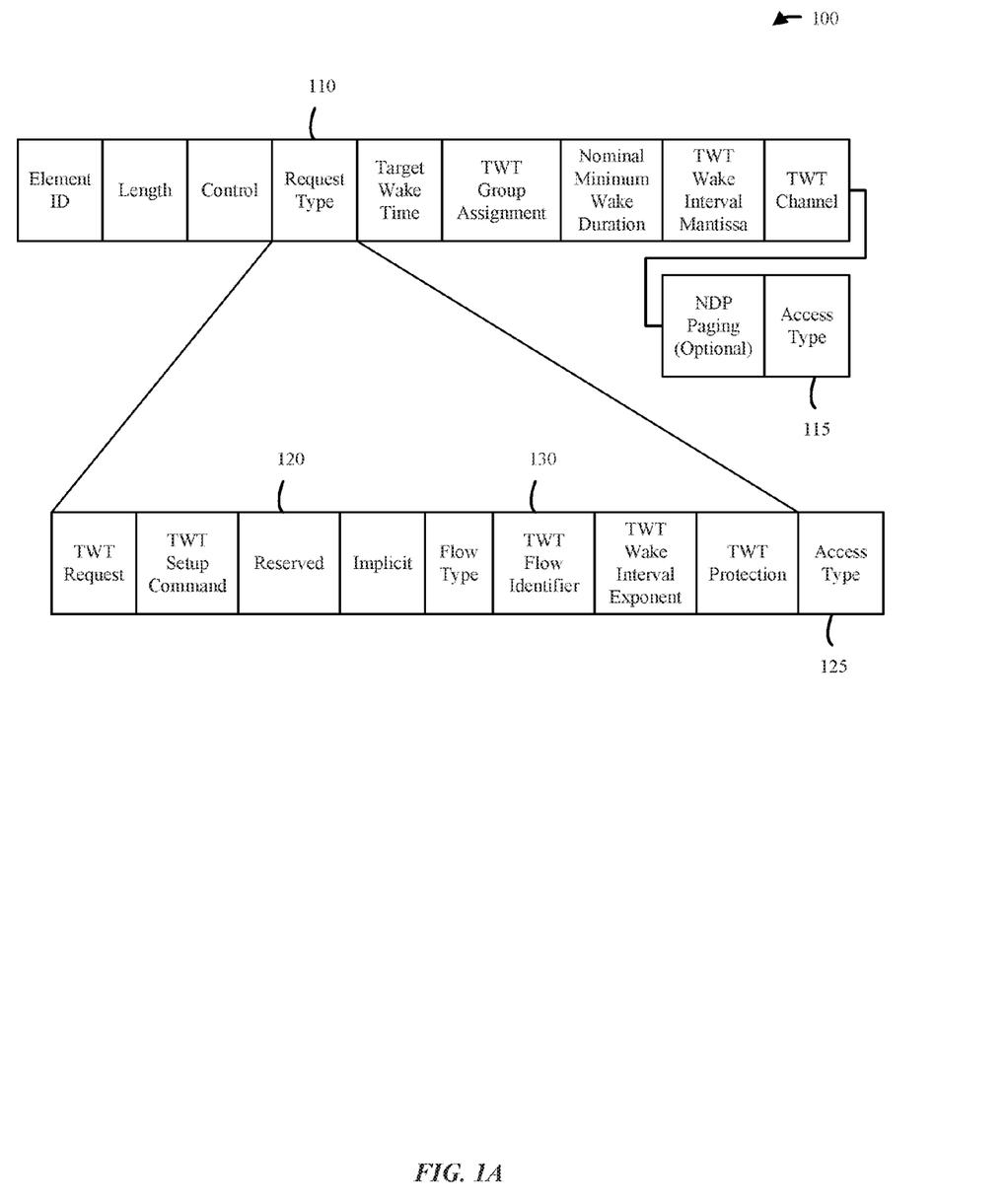
FIG. 1A provides a representative format an example element that can be used for indications of channel access preference and/or policy.

FIG. 1A illustrates a format for a representative TWT element 100 with a representative format for a Request Type field 110 that can be used, modified, and/or re-purposed in some embodiments to indicate a channel access preference and/or channel access policy. In some embodiments where the channel access preference and/or the channel access policy is communicated for a TWT schedule, a 3-bit TWT flow identifier field 130 of the Request Type field 110 may be redefined to convey this information. For example, specific values of the TWT flow identifier field 130 can be used to indicate whether the TWT schedule is for trigger-based access only, EDCA only, or trigger-based access and EDCA. Alternatively, one or more reserved bits, e.g., Reserved field 120, in the request type field 110 in the TWT element 100 can be used. Furthermore, a new field, e.g., Access Type field 125, can be added to the Request Type field 110 and/or a new field, e.g., Access Type field 115, can be added to the TWT element 100.

As a representative example wireless communication protocol, we discuss the IEEE 802.11ax protocol herein; however, the technique described is not limited to use in IEEE 802.11ax electronic devices and wireless local area networks, but can equally be employed in any other wireless communication protocol or version thereof. If an access point wants to set the access policy for all IEEE 802.11ax electronic devices in a basic service set (BSS), a high-efficiency (HE) operation element may need to be expanded to include a new field or element. This new field or element may be labeled 'Access Type', and it may indicate to the electronic devices in the BSS whether all the IEEE 802.11ax electronic devices associated in the BSS can use trigger-based access only, EDCA only, or trigger-based access and EDCA. Furthermore, when all the IEEE 802.11ax electronic devices indicate that they support a particular channel access policy, the access point can set the same channel access policy for all the electronic devices in the BSS. Otherwise, the channel access policy can be set individually for each (or for select) IEEE 802.11ax electronic devices in the BSS.

As noted previously, during trigger-based access, an access point may perform operations on behalf of an electronic device, such as: sense the communication medium and, as needed, perform a back-off operation on behalf of potential uplink trigger access enabled electronic devices; define the uplink PPDU duration for the electronic device; and decide the MCS for the electronic device. We now further describe embodiments of these operations.

Regarding sensing the communication medium and, as needed, performing a back-off operation on behalf of potential uplink trigger access enabled electronic devices, the contention window and back-off operation in IEEE 802.11 provide a means to quickly react to network congestion and interference. In general, when every electronic device associated with an access point performs similarly, the contention window and back-off operation approach works well. Note, however, that an access point may perceive a different operating environment or 'neighborhood' from an electronic device, and a so-called 'hidden node' to the access point may not be a hidden node to the electronic device (and vice versa). Therefore, when the access point senses that the communication medium is free, the electronic device may be experiencing interference (and vice versa). This difference in operating environments can lead to a situation in which the access point either overestimates or underestimates the interference experienced by electronic device, and it may be difficult for the access point to have accurate information about conditions at the electronic device before a trigger is sent to the electronic device. Moreover, overestimating the congestion at the electronic device can lead to longer latency and/or lower network efficiency. Alternatively, underestimating the congestion at the electronic device can lead to more collisions and less network efficiency.

This problem can be addressed in the communication technique by enabling clear channel assessment (CCA) before the trigger response in order to avoid the access point underestimating the interference. For example, as needed, the access point may set the 'CCA required' bit to '1' in the trigger frame. Note that CCA may be enabled none of the time, some of the time, or all the time.

In principle, things may go wrong under certain circumstances. For example, an access point may send a trigger but it may not receive a valid media access control (MAC) protocol data unit or MPDU from one of the triggered electronic devices. In particular, in current proposals, an access point may consider transmission of a trigger frame to be a success even if the access point only receives one correct MPDU (e.g., a correct MPDU may not be received from one or more of the electronic devices). However, from the perspective of a particular electronic device, the transmission of the trigger may be a failure. This could be because: the network allocation vector (NAV) of the electronic device is set; the CCA for the electronic device is busy; the electronic device does not decode the trigger correctly; and/or the MPDU reception for the electronic device at the access point may be incorrect. In any of these cases, a legacy transmitter may perform a 'back-off' operation, because occurrence of one or more of these conditions can imply that the electronic device is experience interference. Stated differently, it is a waste of resources if the access point keeps triggering an electronic device that is experiencing interference.

In some embodiments, a 'back-off' mechanism for failed communication with an electronic device is included in the communication technique. For example, a 'back-off' rule may be defined, such as, if an access point does not receive a valid MPDU from a triggered electronic device, it may not send a trigger to this electronic device for a time interval or duration on the same resource unit (RU) allocation. In an exemplary embodiment, the duration is on the order of hundreds of microseconds. Alternatively, a fraction of a contention window may be used. Moreover, the duration may be fixed or may increase in consecutive instances where a valid MPDU continues to not be received from a triggered electronic device. Furthermore, different electronic devices having different channel access priorities may use different durations. Note that this 'back-off' approach may mimic a back-off operation before a retry on a particular electronic device (e.g., using the same channel, data rate, etc.), providing additional time so that the interference may clear.

Moreover, regarding an access point deciding the uplink PPDU duration for an electronic device, traditionally the electronic device may decide its own PPDU length because it has the best knowledge of its buffered traffic. However, in the communication technique the access point may need to decide a single PPDU length for a set of triggered electronic devices. Because different electronic devices may have different buffered traffic, the electronic devices may have to pad or fragment their data/traffic to fit into a commonly applied PPDU length.

Consider a case in which the electronic device has no traffic to send when a trigger frame is received. This can occur if the electronic device has already flushed out its buffer using EDCA. However, if the electronic device does not respond to the trigger frame, the access point may consider the lack of response from the electronic device to be a transmission failure and may repeat triggering the same electronic device (and, thus, may waste resources). Consequently, in order to avoid wasting resources, the access point may require accurate information about buffer traffic of the electronic device.

In some embodiments, in order to facilitate scheduling by the access point and to provide accurate information about the buffer traffic of an electronic device to the access point, the electronic device may, if possible, try to respond to a trigger frame, including in cases in which the electronic device has no pending data frames to send to the access point. Otherwise, the access point may not know if the lack of reception of a response from the electronic device is due to interference or to an empty pending data queue of the electronic device, and, thus, may keep triggering the electronic device. However, from the perspective of the electronic device, having to respond to the trigger frame by sending a small frame padded with numerous bits to satisfy a required PPDU duration is a waste of power.

This problem may be addressed in the communication technique by having an electronic device respond to the trigger frame with a null data packet or a null data frame with a queue size set to '0', e.g., in a quality-of-service (QoS) control header, if the electronic device has no pending data frames to send when the trigger frame is received from an access point. Alternatively, if the electronic device does not immediately send the null data frame in response to receipt of a trigger frame because of a lack of traffic, it may send a null data frame with queue size set to '0' at the earliest opportunity.

Furthermore, regarding an access point deciding values for a modulation and coding scheme (MCS) for an electronic device, the MCS may be decided by the access point because the access point may need to fit requested data into a PPDU duration, and the MCS can be copied to a SIG-A field of an uplink PPDU. Traditionally, the transmitter (i.e., the electronic device) decides its MCS based on its link adaptation technique. However, for trigger-based access, the transmission rate for the electronic device may be decided by the receiver (i.e., the access point). Consequently, the access point may perform some (or all) of link adaptation on behalf of the electronic devices involved in uplink transmission.

Additionally, traditionally the electronic device decides its MCS based on past history, such as, on a success/failure rate based on block acknowledgements/acknowledgements. In the communication technique, if a similar link adaptation technique is to be used by the access point, then the access point may need to know the number of packets the electronic device actually sent so it can calculate the success or the failure ratio. Alternatively or additionally, the electronic device can recommend one or more values for the MCS to the access point. Note that the link adaptation information may be provided by the electronic device to the access point and can be defined, in some embodiments, in an HE control header. Moreover, the link adaption information can include: a recommended value (or values) for the MCS from the electronic device, a total number of packets sent from the electronic device in a past response to receipt of a trigger frame, or a total number of packets sent in a particular time interval (e.g., a few to ten milliseconds), and/or a packet reception successful or failure ratio determined by the electronic device in the past in response to receipt of a trigger frame or in a past particular time interval. Note that the packet reception successful or failure ratio can be derived based on packets sent and on acknowledgements received.

In some embodiments, the access point uses a different link adaptation technique based on a link budget and on past received packets. For example, the link budget can be mapped to a packet error rate (PER) table as a function of MCS values, and based on a PER requirement, the access point can choose an optimal MCS value for the electronic device to use. The access point can communicate the chosen optimal MCS value to the electronic device in a trigger frame.

For example, the access point may first measure or simulate PER vs. SNR data for different MCS values, which may be stored in a computer-readable storage medium in a tabular format (such as a look-up table). Then, after the access point receives information specifying an SNR from the electronic device, it can determine a highest value for the MCS that can pass a particular PER threshold or requirement (e.g., to not exceed a PER of 10%). Then, the access point may communicate the determined MCS to the electronic device in the trigger frame.

Figure 1B:
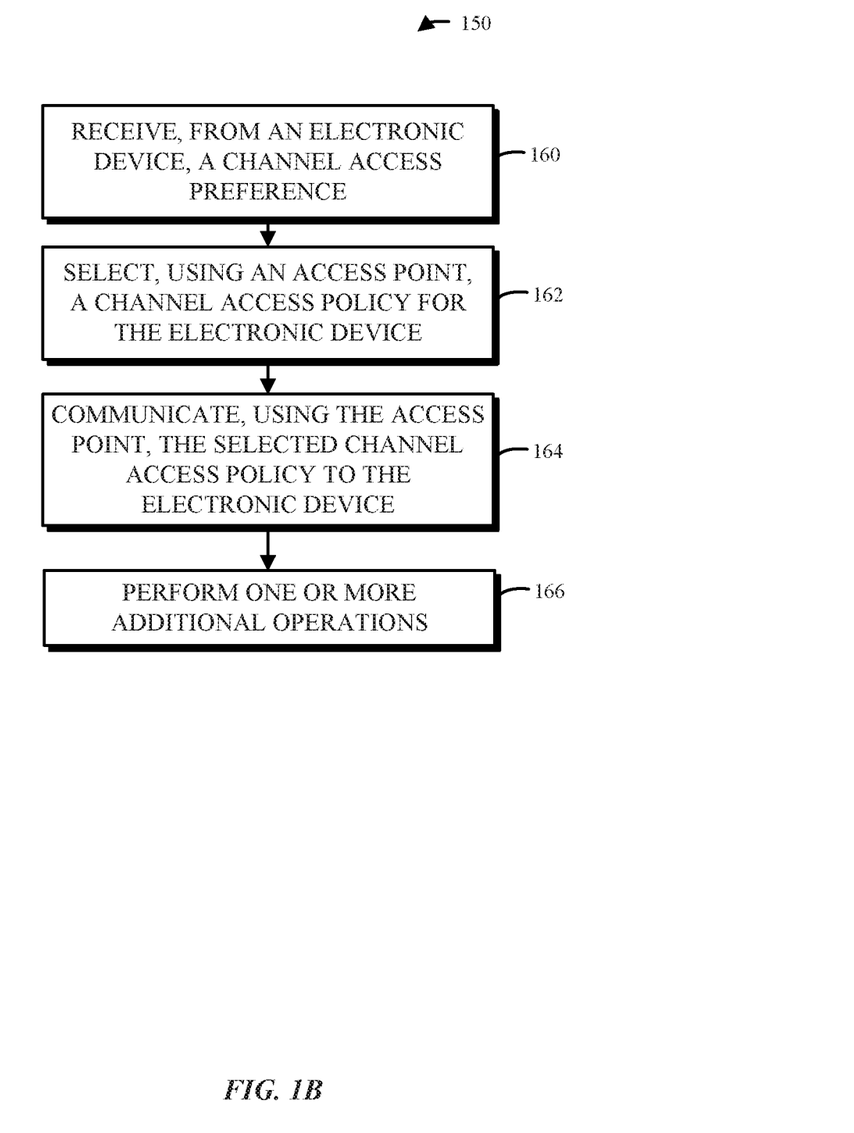
FIG. 1B provides a flow diagram illustrating an example method for selecting a channel access policy by an access point.

We now describe embodiments of example methods. FIG. 1B presents a flow diagram illustrating an example method 150 for selecting a channel access policy for an electronic device in a WLAN (such as a WLAN that uses IEEE 802.11ax) in accordance with some embodiments. The method may be performed by an access point. During operation, the access point receives a channel access preference (operation 160) from the electronic device. For example, the channel access preference may be: a multi-user trigger-based channel access technique, a single-user contention-based channel access technique (such as EDCA), or both. Then, the access point selects the channel access policy (operation 162) for the electronic device based, at least in part, on the received channel access preference and/or a communication performance metric associated with communication in the WLAN. Next, the access point communicates the selected channel access policy (operation 164) to the electronic device.

Note that the selected channel access policy for the electronic device may be used at all times. Alternatively, the selected channel access policy for the electronic device may be used during particular time intervals or service periods. For example, the selected channel access policy may be used in conjunction with a target wakeup time (TWT) schedule or with a power saving class (PSC).

In some embodiments, the access point performs one or more additional operations (operation 166). For example, the access point may receive channel access preferences from multiple electronic devices. Then, the access point may aggregate the multiple electronic devices into groups based on their respective channel access preferences. These groups may each have different channel access policies. Alternatively, the same channel access preference may be used for all of the electronic devices.

Furthermore, the channel access information (such as the channel access preference and/or the selected channel access policy) may be communicated in a variety of ways, such as: during association (e.g., in an association request) and/or by exchanging a management frame between the electronic device and the access point. Moreover, the channel access information may be communicated using unicast or a multicast broadcast.

Note that when a new electronic device joins or associates with an access point, or a BSS, the channel access policy selected by the access point (operation 162) may change for some or all of the electronic devices that are already associated with the access point.

In some embodiments of method 150, there may be additional or fewer operations. Moreover, the order of the operations may be changed, and/or two or more operations may be combined into a single operation.

Figure 1C:
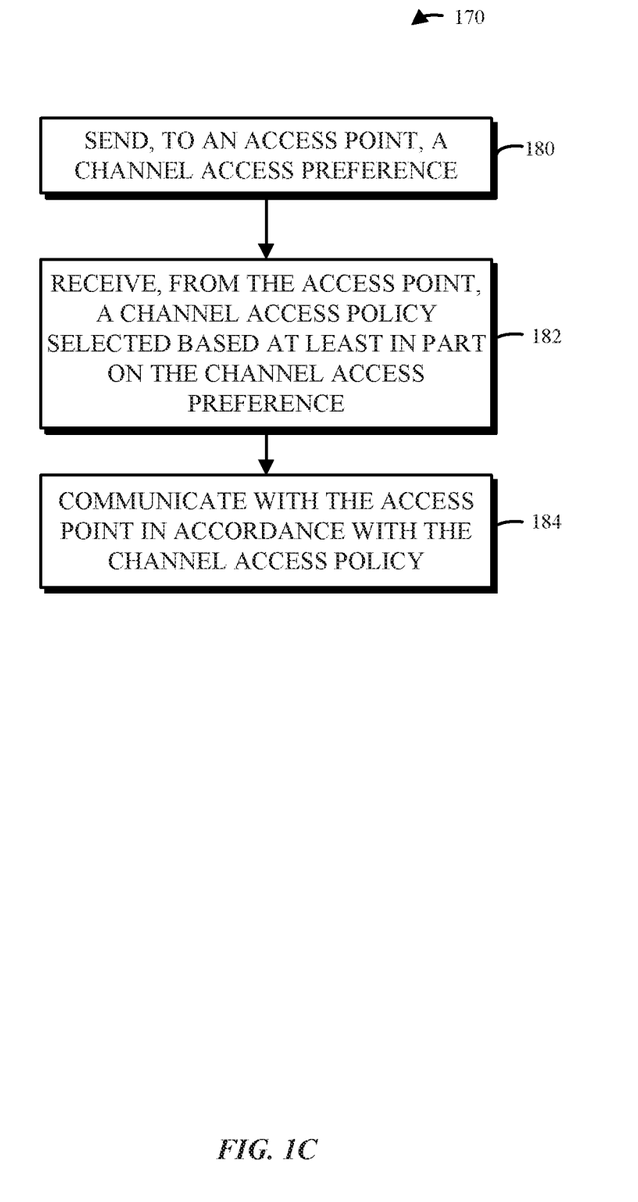
FIG. 1C provides a flow diagram illustrating an example method for obtaining a channel access policy by an electronic device.

FIG. 1C presents a flow diagram illustrating an example method 170 for obtaining a channel access policy by an electronic device in a WLAN (such as a WLAN that uses IEEE 802.11ax) in accordance with some embodiments. The method may be performed by an electronic device in communication with an access point. During operation, the electronic device sends, to an access point, a channel access preference (operation 180). For example, the channel access preference may be: a multi-user trigger-based channel access technique, a single-user contention-based channel access technique (such as EDCA), or both. The electronic device obtain, from the access point selects a channel access policy, selected by the access point based at least in part on the channel access preference sent to the access point (operation 182). In some embodiments, the channel access policy is selected based at least in part on channel access preference and/or a communication performance metric associated with communication in the WLAN.

The selected channel access policy for the electronic device may be used at all times in some embodiments. Alternatively, the selected channel access policy for the electronic device may be used during particular time intervals or service periods. For example, the selected channel access policy may be used in conjunction with a target wakeup time (TWT) schedule or with a power saving class (PSC).

The electronic device communicates with the access point in accordance with the channel access policy (operation 184). The electronic device can determine to use a multi-user trigger-based channel access technique, a single-user contention-based channel access technique, (such as EDCA), or both, based on the channel access policy obtained from the access point. In some embodiments, the electronic device receives triggers from the access point and responds to triggers received based on the channel access policy obtained from the access point.

In some embodiments, the access point may receive channel access preferences from multiple electronic devices, including the electronic device, and select a channel access policy for the electronic device based on a compilation of the channel access preferences from the multiple electronic devices. The access point may aggregate the multiple electronic devices into groups based on their respective channel access preferences. These groups may each have different channel access policies. Alternatively, the same channel access preference may be used for all electronic devices in all of the groups.

Furthermore, the channel access information (such as the channel access preference and/or the selected channel access policy) may be communicated from the access point to the electronic device, and to the access point from the electronic device, in a variety of ways, such as: during association (e.g., in an association request) and/or by exchanging a management frame between the electronic device and the access point. Moreover, the channel access information may be communicated using unicast messages, using a multicast message (or messages), and/or using a broadcast message (or messages).

When a new electronic device joins or associates with an access point, or a BSS, the access point may update the channel access policy and provide an updated channel access policy to some or all of the electronic devices that are already associated with the access point.

In some embodiments of method 170, there may be additional or fewer operations. Moreover, the order of the operations may be changed, and/or two or more operations may be combined into a single operation.

Figure 2:
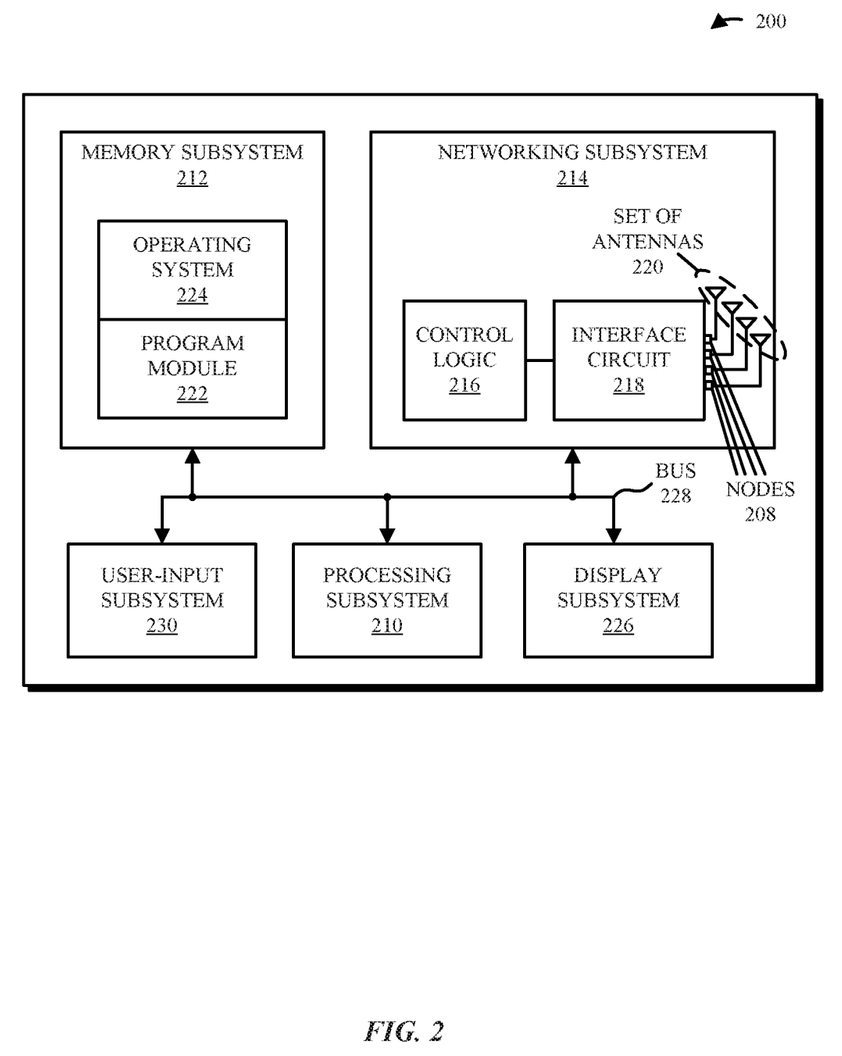
FIG. 2 provides a block diagram illustrating an example electronic device.

We now describe embodiments of an electronic device. FIG. 2 presents a block diagram of an electronic device 200 (which may be a station) in accordance with some embodiments. The block diagram of the electronic device 200 may also be applicable for an access point that communicates with additional electronic devices, such as stations. The electronic device includes processing subsystem 210, memory subsystem 212, and networking subsystem 214. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), a read-only memory (ROM), flash memory, and/or other types of memory. In some embodiments, instructions for processing subsystem 210 in memory subsystem 212 include: one or more program modules or sets of instructions (such as program module 222 or operating system 224), which may be executed by processing subsystem 210. For example, a ROM can store programs, utilities or processes to be executed in a non-volatile manner, and DRAM can provide volatile data storage, and may store instructions related to the operation of electronic device 200. Note that the one or more computer programs may constitute a computer-program mechanism or software. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210. In some embodiments, the one or more computer programs are distributed over a network-coupled computer system so that the one or more computer programs are stored and executed in a distributed manner.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including: control logic 216, an interface circuit 218 and a set of antennas 220 (or antenna elements) in an adaptive array that can be selectively turned on and/or off by control logic 216 to create a variety of optional antenna patterns or 'beam patterns.' (While FIG. 2 includes set of antennas 220, in some embodiments electronic device 200 includes one or more nodes, such as nodes 208, e.g., a pad, which can be coupled to set of antennas 220. Thus, electronic device 200 may or may not include set of antennas 220.) For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 200 may use the mechanisms in networking subsystem 214 for performing simple wireless communication between the electronic devices, e.g., transmitting advertising or beacon frames and/or scanning for advertising frames transmitted by other electronic devices.

Within electronic device 200, processing subsystem 210, memory subsystem 212, and networking subsystem 214 are coupled together using bus 228 that facilitates data transfer between these components. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections among the subsystems.

In some embodiments, electronic device 200 includes a display subsystem 226 for displaying information on a display, which may include a display driver and the display, such as a liquid-crystal display, a multi-touch touchscreen, etc. Display subsystem 226 may be controlled by processing subsystem 210 to display information to a user (e.g., information relating to incoming, outgoing, or an active communication session).

Electronic device 200 can also include a user-input subsystem 230 that allows a user of the electronic device 200 to interact with electronic device 200. For example, user-input subsystem 230 can take a variety of forms, such as: a button, keypad, dial, touch screen, audio input interface, visual/image capture input interface, input in the form of sensor data, etc.

Electronic device 200 can be (or can be included in) any electronic device with at least one network interface. For example, electronic device 200 may include: a cellular telephone or a smartphone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 200, in alternative embodiments, different components and/or subsystems may be present in electronic device 200. For example, electronic device 200 may include one or more additional processing subsystems, memory subsystems, networking subsystems, and/or display subsystems. Additionally, one or more of the subsystems may not be present in electronic device 200. Moreover, in some embodiments, electronic device 200 may include one or more additional subsystems that are not shown in FIG. 2. Also, although separate subsystems are shown in FIG. 2, in some embodiments some or all of a given subsystem or component can be integrated into one or more of the other subsystems or component(s) in electronic device 200. For example, in some embodiments program module 222 is included in operating system 224 and/or control logic 216 is included in interface circuit 218.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 214. This integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a trigger, providing a trigger response, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 222, operating system 224 (such as a driver for interface circuit 218) or in firmware in interface circuit 218. Alternatively or additionally, at least some of the operations in the communication technique may be implemented in a physical layer, such as hardware in interface circuit 218. In an exemplary embodiment, the communication technique is implemented, at least in part, in a MAC layer in interface circuit 218.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   one or more antennas; and
   an interface circuit, communicatively coupled to the one or more antennas, configured to communicate with an electronic device using wireless communication, wherein, during operation, the interface circuit:
      receives a channel access preference from the electronic device;
      selects a channel access policy for the electronic device based, at least in part, on the received channel access preference; and
      communicates the selected channel access policy to the electronic device,
   wherein:
      the channel access preference indicates:
         whether the electronic device permits multi-user trigger-based channel access, and
         whether the electronic device permits single-user contention-based channel access, and
      the channel access policy indicates whether the electronic device is permitted to use multi-user trigger-based channel access, single-user contention-based channel access, or both.

2. The access point of claim 1, wherein when the channel access preference indicates the electronic device permits both multi-user trigger-based channel access and single-user contention-based channel access, the channel access preference further indicates whether or not the electronic device has a preference for which channel access the access point selects.

3. The access point of claim 2, wherein the single-user contention-based channel access comprises enhanced distributed channel access (EDCA).

4. The access point of claim 1, wherein the access point selects the channel access policy based, at least in part, on a communication performance metric associated with the wireless communication.

5. The access point of claim 1, wherein the wireless communication involves an IEEE 802.11 communication protocol.

6. The access point of claim 1, wherein the selected channel access policy for the electronic device is used at all times during a time interval.

7. The access point of claim 1, wherein the selected channel access policy for the electronic device is used at one or more particular times during a time interval.

8. The access point of claim 7, wherein the one or more particular times are associated with one of: a target wakeup time (TWT) schedule, or a power saving multi-poll (PSMP).

9. The access point of claim 1, wherein the selected channel access policy for the electronic device is communicated using one of: unicast communication between the access point and the electronic device; or multicast communication between the access point and multiple electronic devices, including the electronic device.

10. The access point of claim 1, wherein, during operation, the interface circuit:
    receives channel access preferences from multiple electronic devices;
    aggregates the multiple electronic devices into groups of electronic devices based, at least in part, on their channel access preferences;
    selects channel access policies for the groups of electronic devices; and
    communicates the selected channel access policies to the groups of electronic devices.

11. The access point of claim 10, wherein the groups of electronic devices have different channel access policies.

12. The access point of claim 1, wherein the access point receives the channel access preference from the electronic device during association.

13. The access point of claim 12, wherein the access point receives the channel access preference from the electronic device in an association request.

14. The access point of claim 1, wherein at least one of the channel access preference and the channel access policy is communicated between the access point and the electronic device in a management frame.

15. A method for selecting a channel access policy for an electronic device, the method comprising:
    by an access point:
       receiving a channel access preference from the electronic device;
       selecting a channel access policy for the electronic device based, at least in part, on the received channel access preference; and
       communicating the selected channel access policy to the electronic device,
    wherein:
       the channel access preference indicates:
          whether the electronic device permits multi-user trigger-based channel access, end
          whether the electronic device permits single-user contention-based channel access, and
       the channel access policy indicates whether the electronic device is permitted to use multi-user trigger-based channel access, single-user contention-based channel access, or both.

16. The method of claim 15, wherein when the channel access preference indicates the electronic device permits both multi-user trigger-based channel access and single-user contention-based channel access, the channel access preference further indicates whether or not the electronic device has a preference for which channel access the access point selects.

17. The method of claim 15, further comprising:
    by the access point:
       receiving channel access preferences from multiple electronic devices;

aggregating the multiple electronic devices into a group of electronic devices based, at least in part, on their channel access preferences;

selecting a channel access policy for the group of electronic devices; and communicating the selected channel access policies to the group of electronic devices.

18. The method of claim 17, wherein a channel access policy for the group of electronic devices differs from a second channel access policy associated with a second group of electronic devices.

19. The method of claim 15, wherein the access point receives the channel access preference from the electronic device during association in an association request.

20. An electronic device comprising:
one or more antennas; and
an interface circuit, communicatively coupled to the one or more antennas, configured to communicate with an access point using wireless communication, wherein, during operation, the interface circuit:

sends a channel access preference to the access point;

receives, from the access point, a channel access policy selected for the electronic device by the access point based, at least in part, on the channel access preference; and communicating with the access point in accordance with the channel access policy, wherein:
the channel access preference indicates:
whether the electronic device permits multi-user trigger-based channel access, and
whether the electronic device permits single-user contention-based channel access, and
the channel access policy indicates whether the electronic device is permitted to use multi-user trigger-based channel access, single-user contention-based channel access, or both.

* * * * *